United States Patent [19]

Baker

[11] 4,176,812
[45] Dec. 4, 1979

[54] MIDCABIN DOOR FOR BLENDED WING AIRCRAFT

[75] Inventor: Irwin G. Baker, Bellevue, Wash.

[73] Assignee: The Boeing Company, Seattle, Wash.

[21] Appl. No.: 847,100

[22] Filed: Oct. 31, 1977

[51] Int. Cl.² .............................................. B64C 1/14
[52] U.S. Cl. .................................... 244/129.5; 49/33; 244/137 P
[58] Field of Search ............... 244/129.5, 129.6, 129.4, 244/129.3, 129.1, 130, 119, 117 R, 15, 137 R, 137 P, 118 R, 118 P, 12.1, 23 C; 49/33, 37; 296/146, 62; 105/443, 447, 448, 449; 52/183

[56] References Cited

U.S. PATENT DOCUMENTS

| | | | |
|---|---|---|---|
| 2,500,015 | 3/1950 | Tweney et al. | 244/119 |
| 2,951,454 | 9/1960 | Candlin, Jr. | 105/447 |
| 3,051,280 | 8/1962 | Bergman et al. | 244/129.5 |
| 3,465,991 | 9/1969 | Banas et al. | 244/DIG. 2 |
| 3,476,338 | 11/1969 | Fisher | 244/137 P |
| 3,795,205 | 3/1974 | Gritchen et al. | 105/443 |
| 3,877,665 | 4/1975 | Riccius | 244/130 |

Primary Examiner—Galen L. Barefoot
Attorney, Agent, or Firm—Christensen O'Connor, Johnson & Kindness

[57] ABSTRACT

An aircraft in which the fuselage and wings are configured in a blended wing design has a door opening in the fuselage adjacent the wing and a door assembly for closing the door opening. The door assembly includes a door having an exterior panel that conforms to the shape of the aircraft at the location of the door opening when the door is closed and having an interior structure configured in a series of steps. The door is movable between a closed position in which an upper edge of the door panel is adjacent an upper edge of the door opening and an open position in which the door panel lies substantially within the wing and in which the upper edge of the door panel is adjacent an upper surface of the wing and spaced from the fuselage. When the door is in the open position, the steps form a stairway leading from the fuselage up and out of the aircraft to the upper surface of the wing. Preferably, the door assembly also includes a movable wing panel which is slaved to the door such that, as the door is moved from the closed to the open position, the wing panel moves to uncover an opening in the wing upper surface through which the door passes to reach its open position.

21 Claims, 12 Drawing Figures

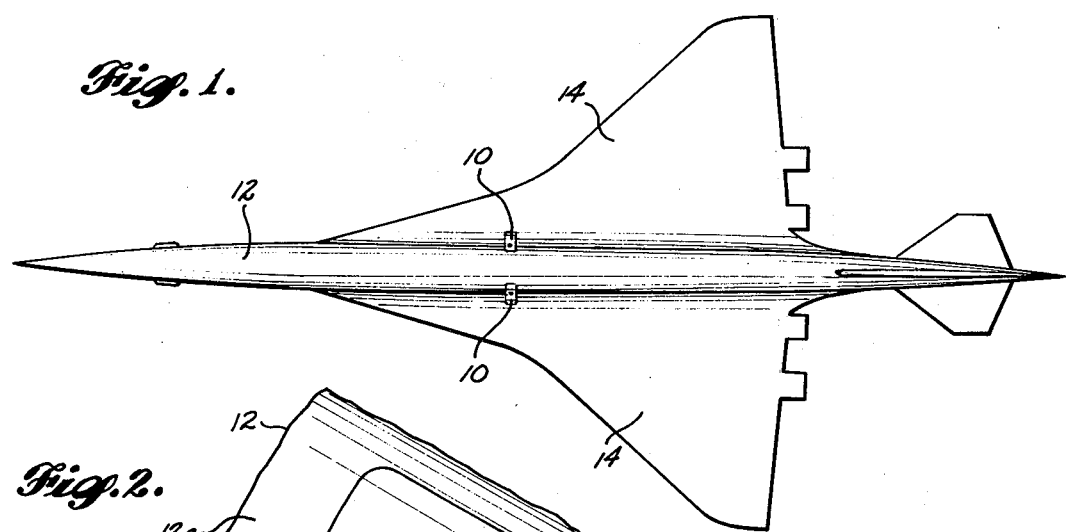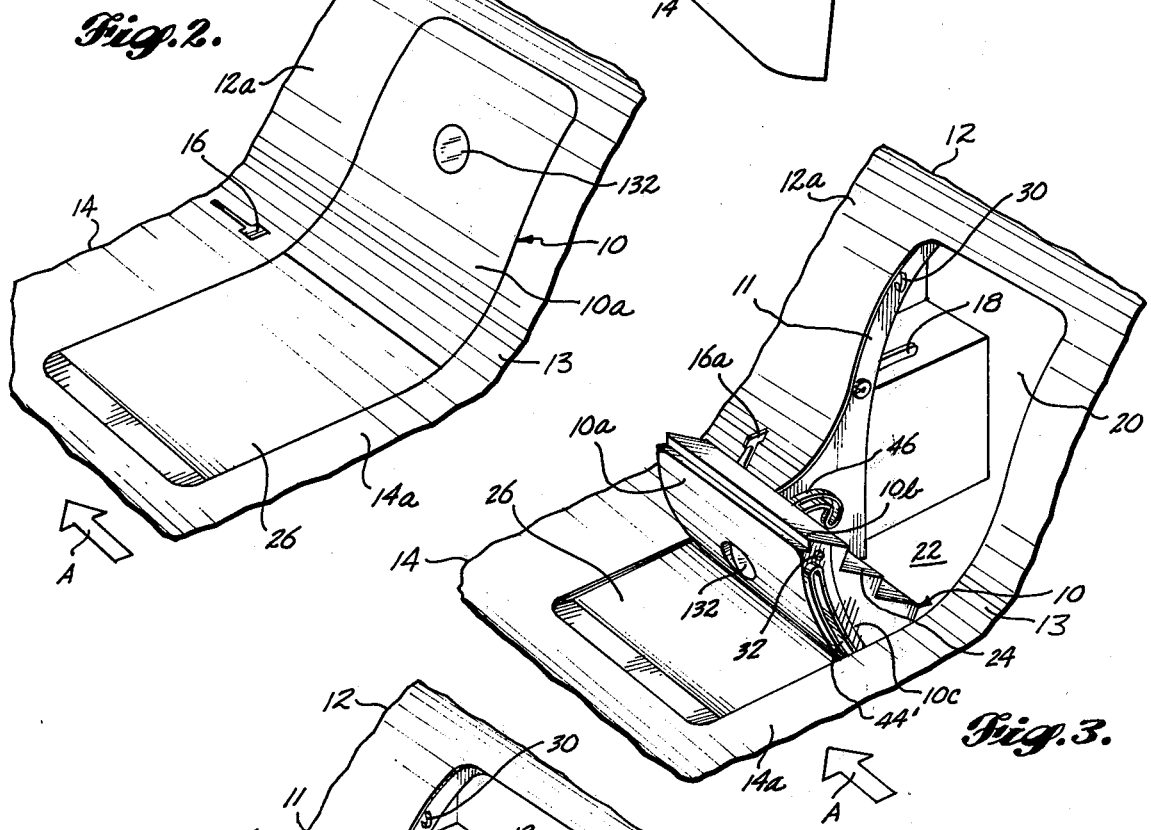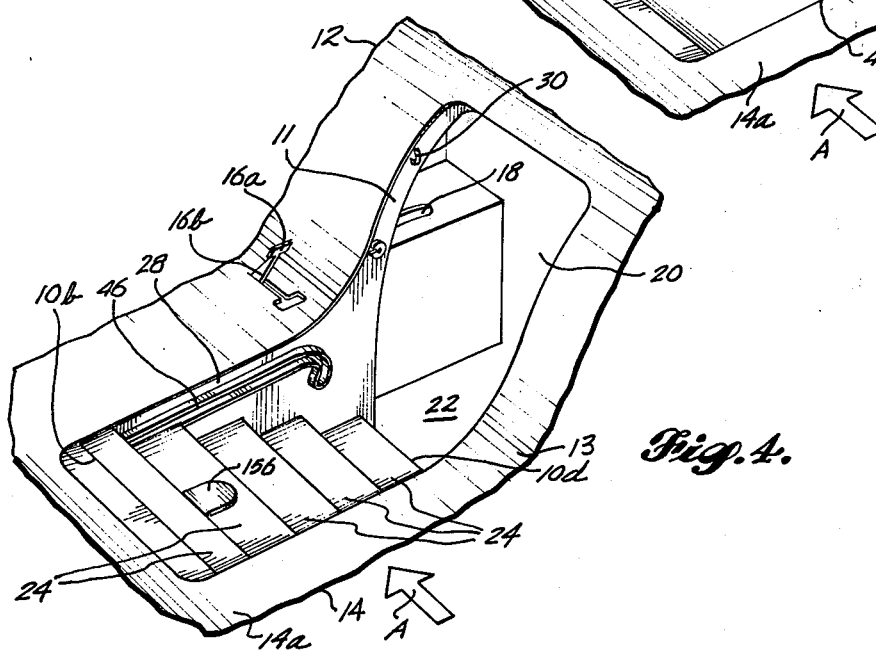

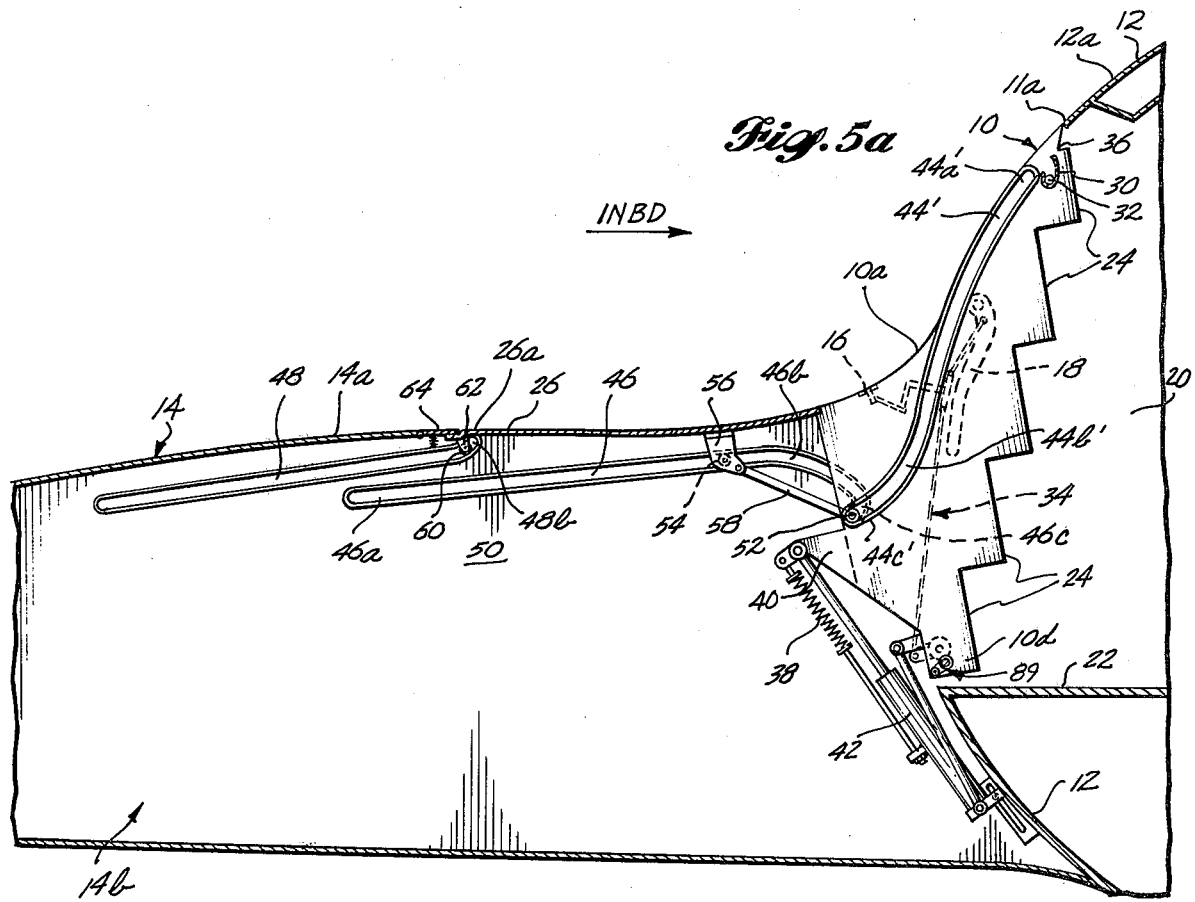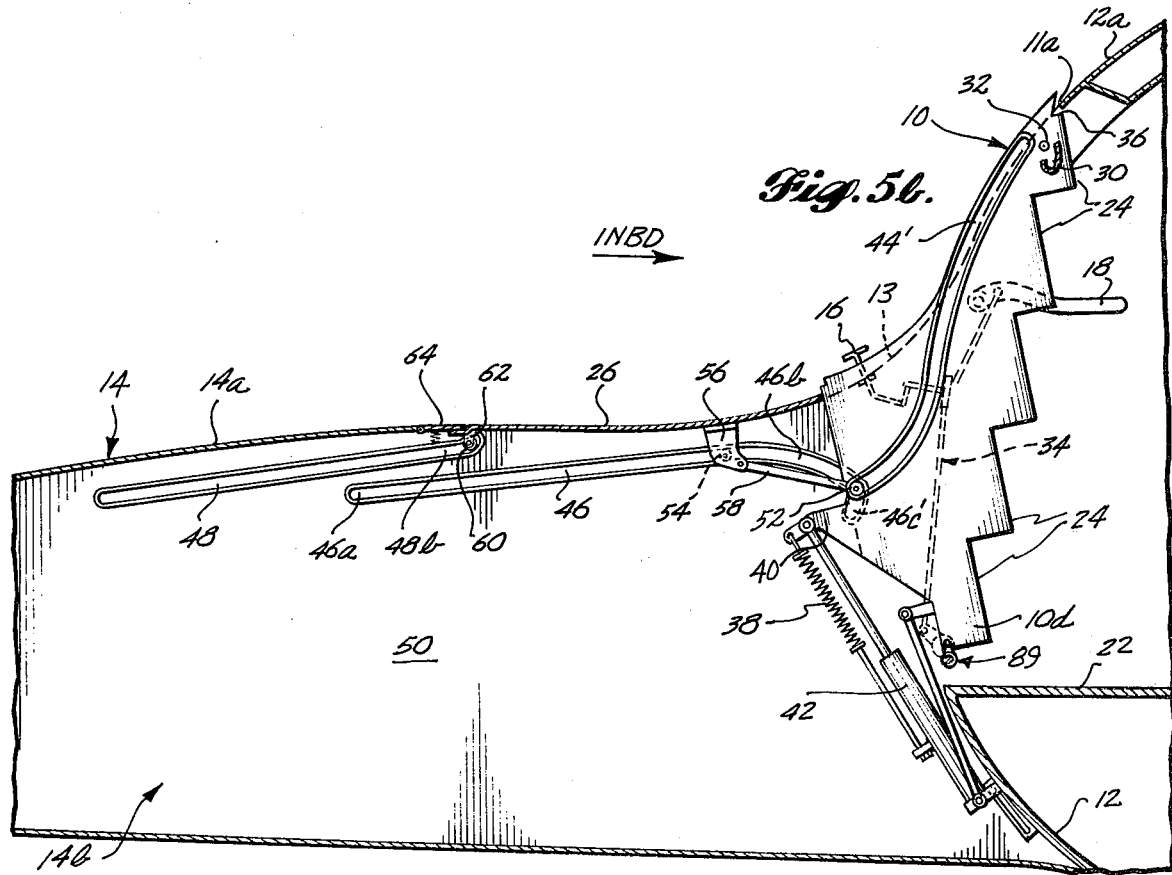

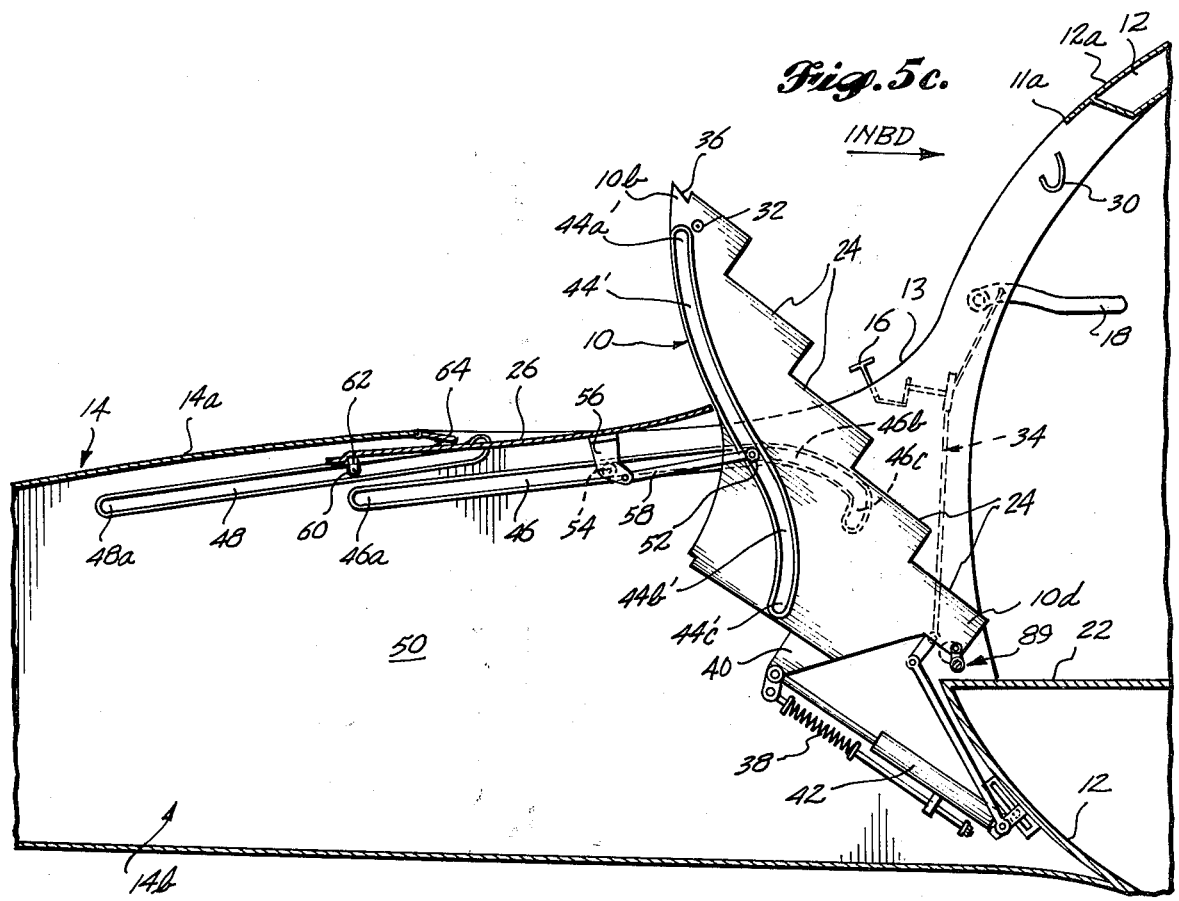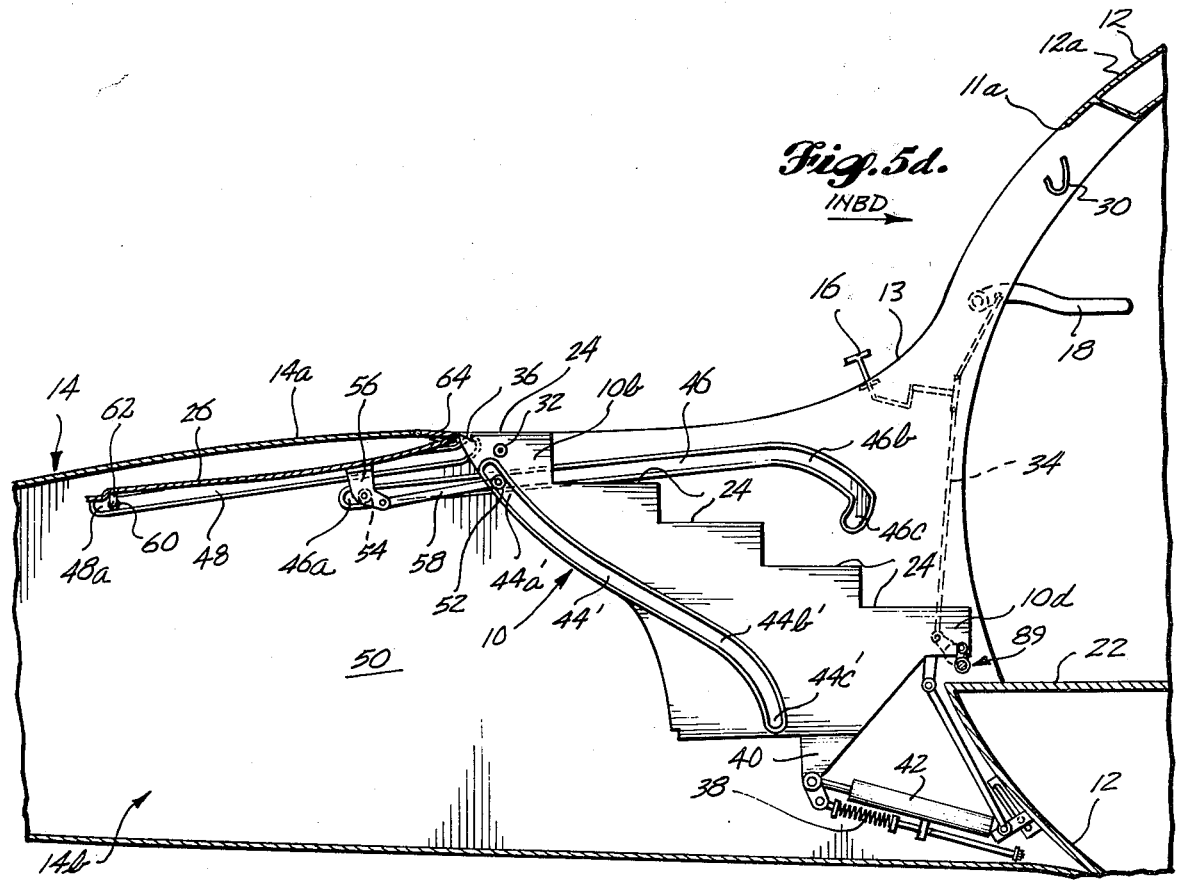

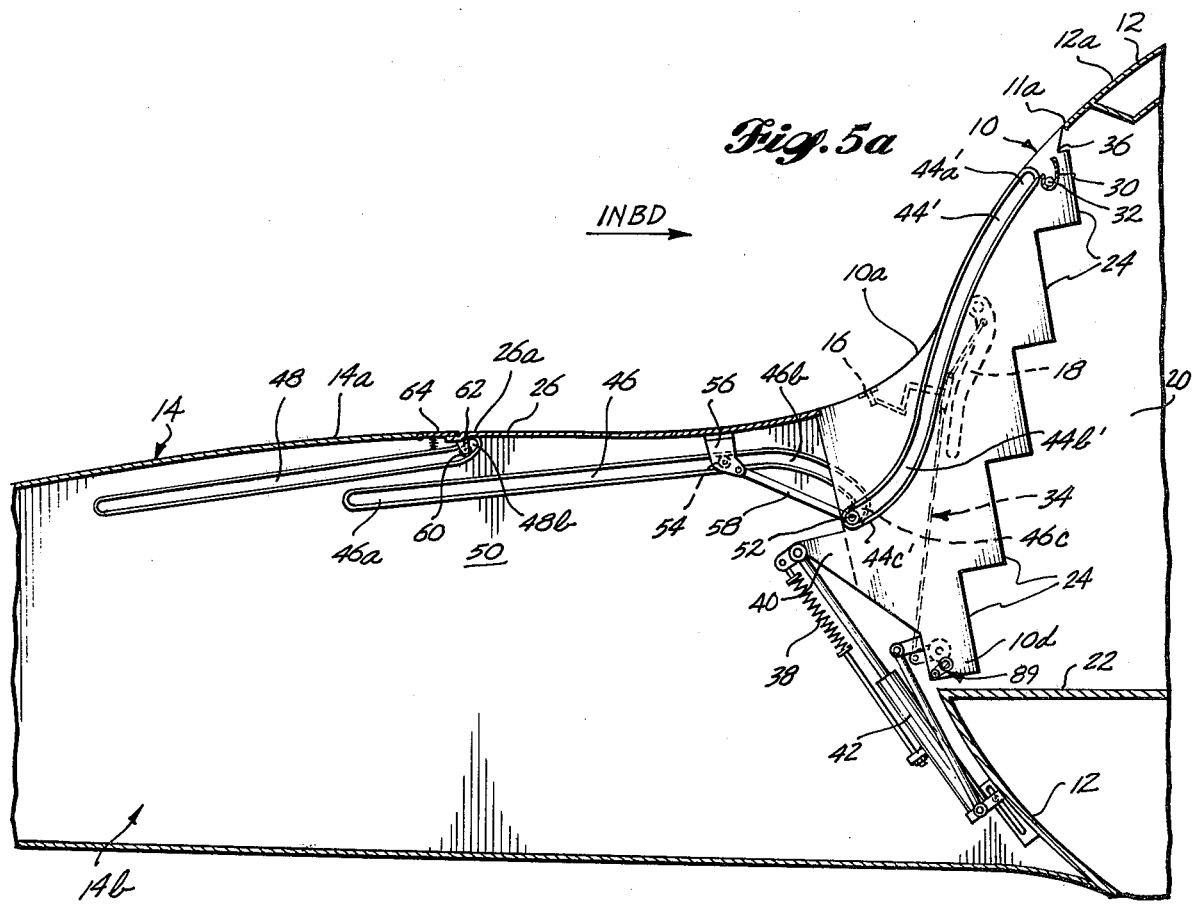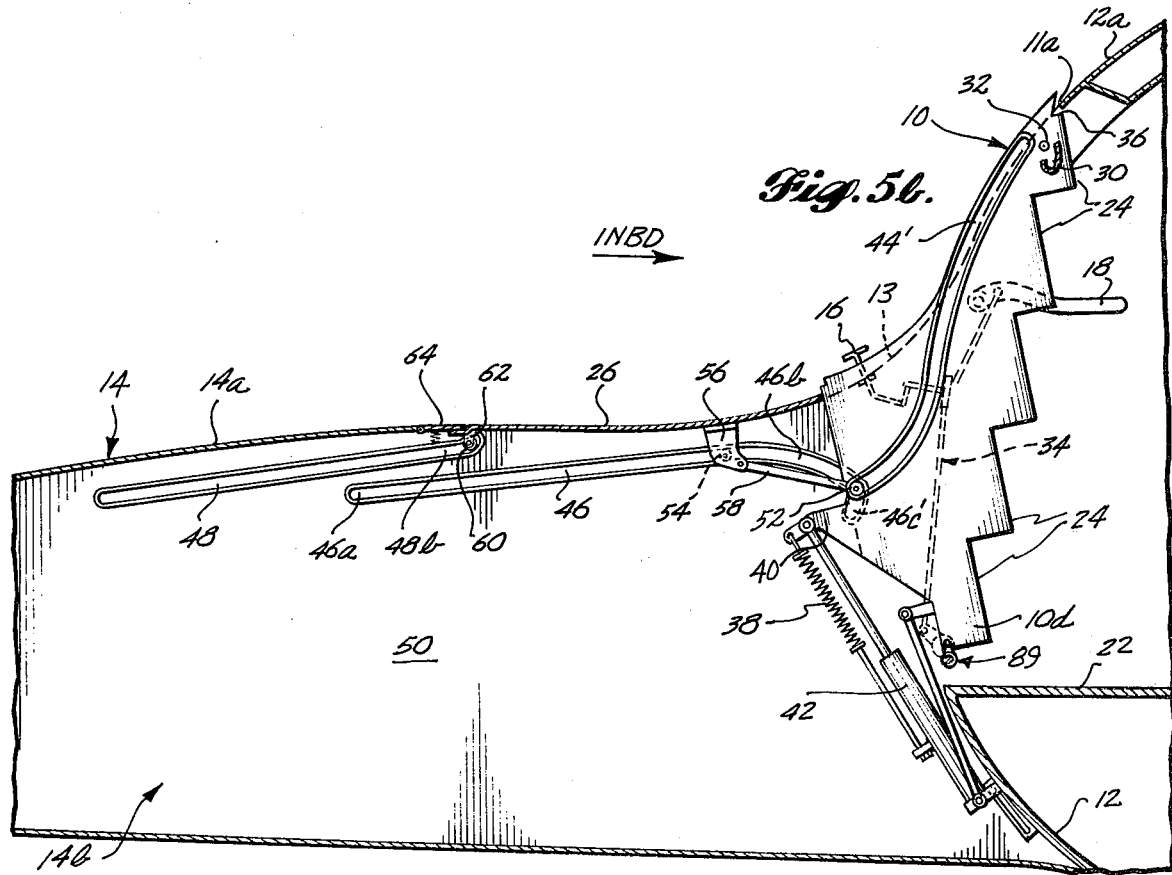

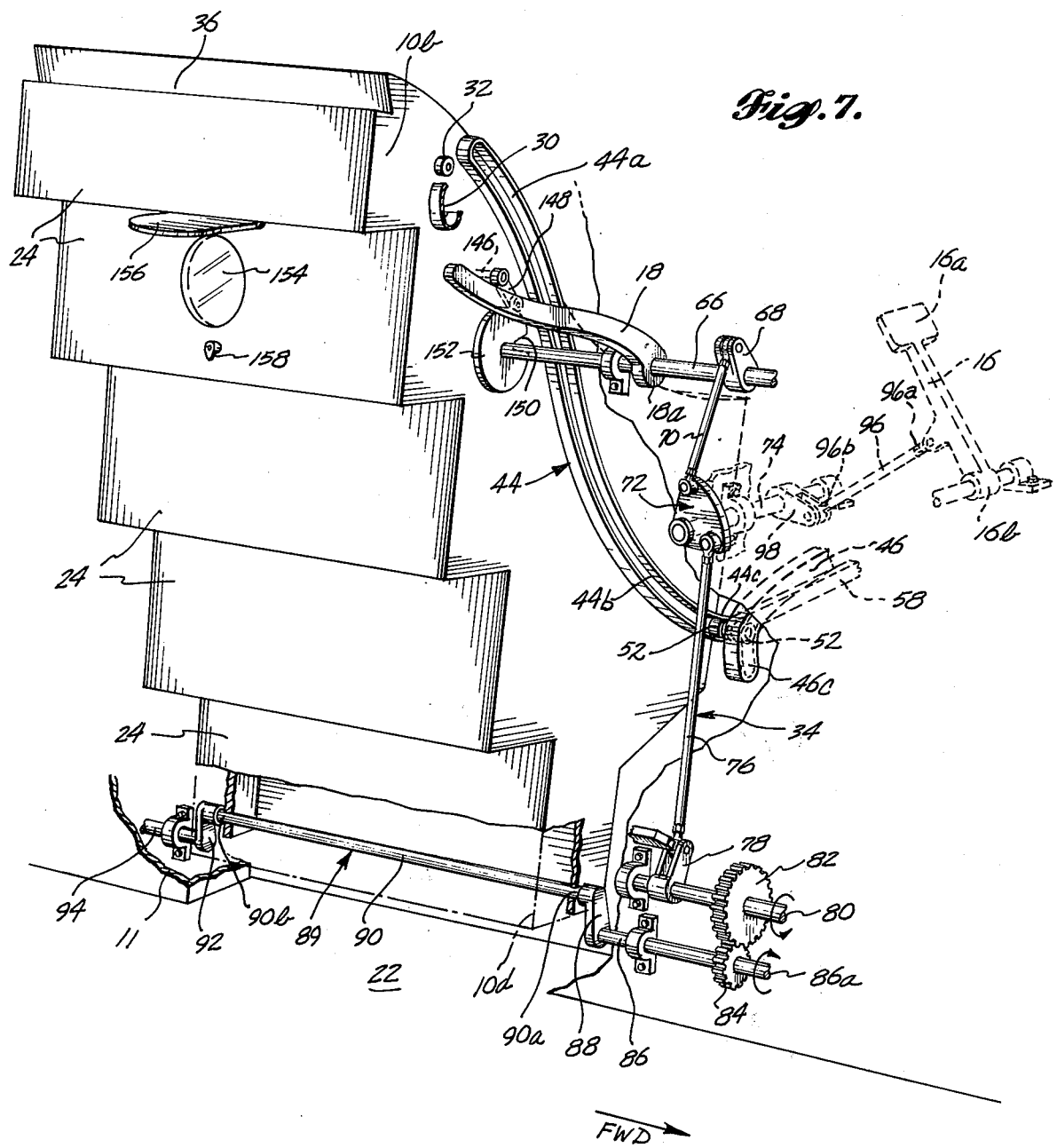

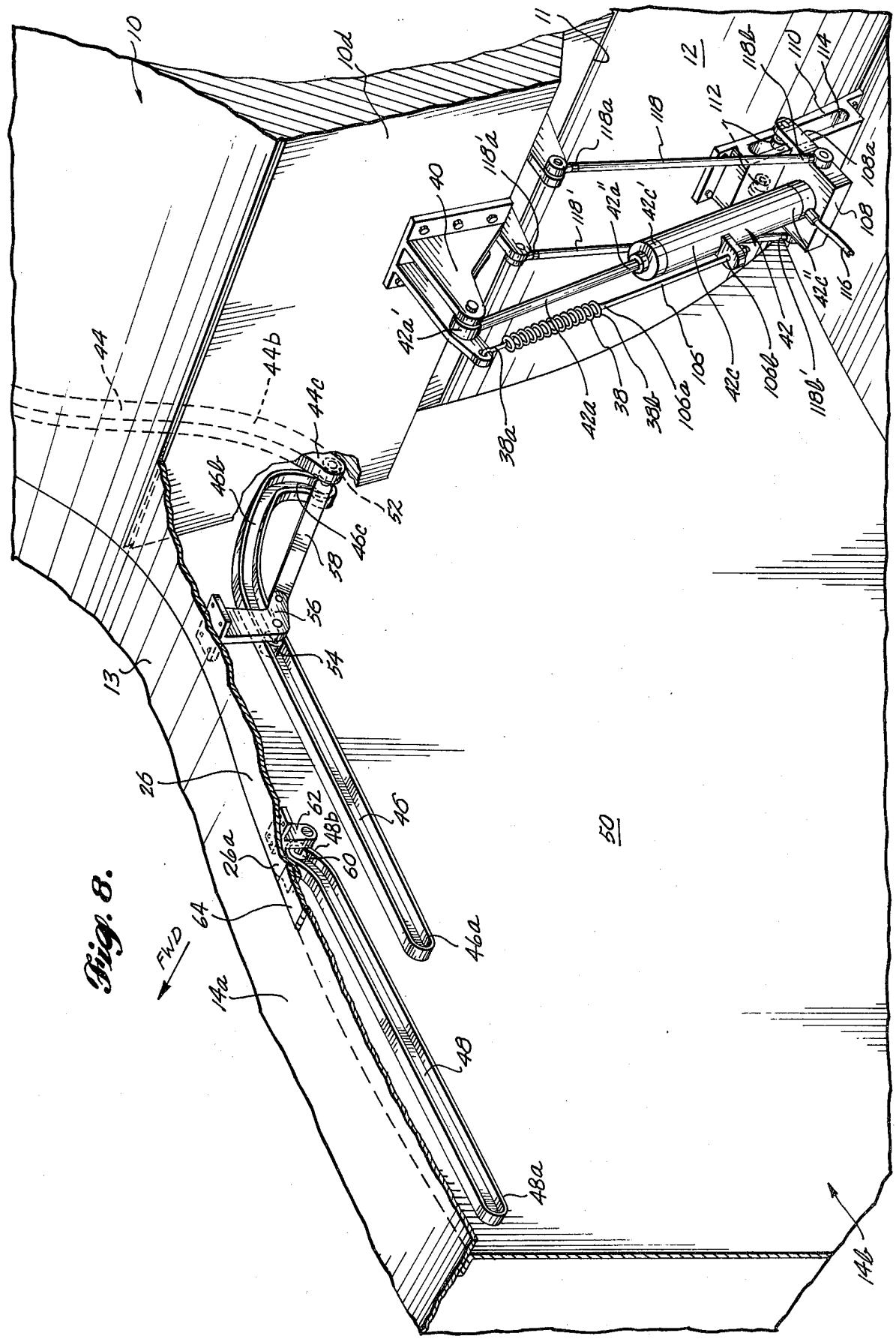

MIDCABIN DOOR FOR BLENDED WING AIRCRAFT

BACKGROUND OF THE INVENTION

This invention relates to aircraft doors, and more particularly to a midcabin door for an aircraft of blended wing design.

The normal passenger access doors of a passenger jet aircraft are located either at the forward or aft end of the cabin. The Federal Aviation Administration (FAA) requires that passenger aircraft be designed so that passengers can leave the aircraft in an emergency at a certain predetermined rate. To enable the exit rate to meet FAA standards, it is typical to locate additional doors at midcabin for use in emergency situations.

Typically, the midcabin doors open onto the aircraft wings and passengers exit from the cabin across the wing to escape slides or ladders. In a standard jet aircraft, the passenger cabin floor is at approximately the same level as the wing upper surface or at a slightly higher level. Prior art midcabin doors have therefore been built to move passengers from the cabin to the wing at the same level or from a higher cabin floor to a lower wing level.

With the advent of the supersonic transport, new fuselage and wing designs were developed to provide the proper aerodynamic characteristics for high speed flight. One of the body designs developed was that utilizing a blended wing concept. In a blended wing aircraft, the fuselage and wings are joined to form a smooth curve along the exterior of the aircraft with no discrete interface between the fuselage and the wing. In a blended wing aircraft, the cabin floor is some distance below the level of the upper surface of the wing. In order for the midcabin doors to be useful in offloading passengers, a walkway must be provided upwardly through the door opening in the fuselage and onto the upper surface of the wing.

It is therefore an object of this invention to provide a new, improved midcabin door for an aircraft.

It is a further object to provide a midcabin door for use on an aircraft of blended wing design.

It is yet another object of this invention to provide a midcabin door which enables passengers to exit an aircraft from a cabin floor up and onto a wing surface higher than the cabin floor.

It is a still further object of this invention to provide a midcabin door which lies substantially within the aircraft wing in the open position.

It is another object of this invention to provide a midcabin door which is suitable for use on aircraft having pressurized cabins.

SUMMARY OF THE INVENTION

In accordance with the foregoing objects, a door assembly is provided for use in an aircraft having a fuselage and a wing and having a door opening in the fuselage adjacent the wing. The wing has an upper surface that blends smoothly into the fuselage to form a blend region between the wing and the fuselage and at least a portion of the door opening extends into the blend region. The door assembly includes a door having an upper portion and a lower portion and having an exterior panel conforming to the shape of the fuselage and the blend region when the door is in a closed position. The door assembly further includes first means for mounting the door for swinging movement between the closed position wherein the upper portion of the door is adjacent an upper portion of the door opening and the lower portion of the door is adjacent a lower portion of the door opening and an open position wherein the upper portion of the door is located outwardly from the fuselage, adjacent the upper surface of the wing.

In a preferred embodiment of the door assembly the door opening has an extended portion that extends outwardly into the upper surface of the wing from adjacent the bottom portion of the door when the door is in the closed position. A wing panel is included that covers the extended portion of the opening when the door is in the closed position. The wing panel is mounted for translational movement from a closed position covering the extended portion of the opening to an open position wherein the wing panel is translated away from the extended portion. As the door swings from the closed position to the open position the door passes through the extended portion of the opening. In the open position the door lies below the extended portion and below the upper surface of the wing.

Also, the preferred embodiment of the door assembly includes means for coupling the wing panel to the door. The movement of the wing panel is programmed by the coupling means so that the wing panel translates out of registration with the extended portion of the door opening as the door moves from the closed position to the open position and so that the inner edge of the wing panel always lies adjacent the exterior panel of the door as the door swings between the open and closed positions. The interior portion of the door can also be constructed to include a series of steps so that when the door is in the open position the steps provide a stairway leading out of the fuselage and onto the wing upper surface.

BRIEF DESCRIPTION OF THE DRAWINGS

The foregoing objects and advantages of the present invention will be more readily understood by those skilled in the art and others after reading the detailed description set forth below, together with the following drawings, wherein:

FIG. 1 is a plan view of an aircraft of blended wing design which incorporates the midcabin door assembly of the present invention;

FIG. 2 is an isometric view of a door made in accordance with the principles of this invention in its closed position;

FIG. 3 is an isometric view of the door of FIG. 2 in a partially open position;

FIG. 4 is an isometric view of the door of FIG. 2 in its open position;

FIGS. 5a, 5b, 5c and 5d are cross sectional view looking forwardly along the aircraft of FIG. 1 showing a sequence of positions of the door of FIG. 2 from its closed to its open position;

FIG. 6 is an isometric view of a door and linkage made in accordance with the principles of this invention with the door and the linkage shown in the closed position;

FIG. 7 is an isometric view of the door and linkage of FIG. 6 as the door begins moving to its open position;

FIG. 8 is a cutaway isometric view of the wing showing the bottom of the door of FIG. 6 and a door closing and opening apparatus formed in accordance with the principles of this invention;

DETAILED DESCRIPTION OF THE PREFERRED EMBODIMENT

Figure 9:
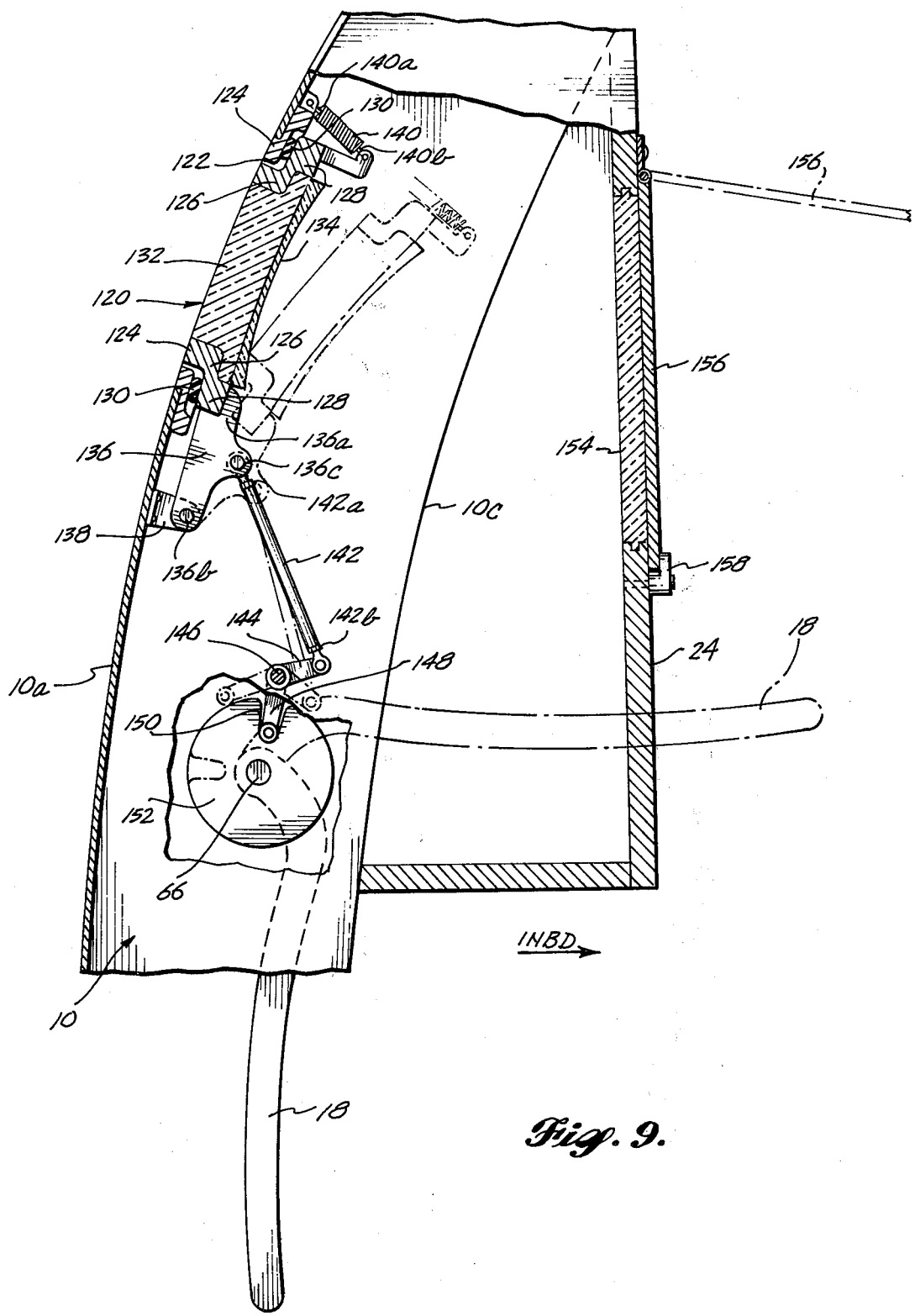
FIG. 9 is a side view in cross section of the door of FIG. 6.

Referring to FIG. 1 the fuselage and wing of a supersonic aircraft are constructed according to a blended wing design. Emergency doors 10 are located in the fuselage 12 approximately midway between the forward and aft ends of the fuselage and above each wing 14. The enlarged view of FIGS. 2, 3, and 4 show a portion of the fuselage 12 and wing 14 in which the door 10 is located. The blended wing design of the aircraft is characterized by the smooth shallow curve formed by the exterior structural panels between the fuselage and wing. Unlike conventional aircraft designs the blended wing aircraft has no discrete interface between the fuselage and the wings. The exterior skin of the fuselage and the upper skin of the wing blend together to form a blend region 13 having a smooth, shallow curvature in the area at which the wing and fuselage are joined together. The upper portion of the door opening is positioned along the fuselage side above the blend region. A lower portion of the door opening in the fuselage extends into the blend region 13. The door opening further has an extended portion that extends outboard from the blend region into the wing upper skin. The door 10 passes through the extended portion as it moves to an open position. FIGS. 2, 3, and 4 show the sequence of operation of the door 10 from its fully closed position (FIG. 2) to its fully open position (FIG. 4). In all three of the figures, an arrow A denotes the forward direction relative to the aircraft.

The door 10 is opened from the outside of the aircraft by pulling a handle 16 located in the exterior of the aircraft forward of the door 10 so that a first end 16a of the handle 16 moves upwardly and pivots about a second end 16b which remains journalled within the fuselage/wing interface. The exterior handle 16 is positioned so that the journalled end 16b is forward of the free end 16a. The handle arrangement described allows the force exerted on the handle 16 by air flowing across the wing 14 to urge the handle 16 into and keep it in the closed position, thereby increasing the safety of the handle and preventing accidental opening of the door. A complementary handle 18 is located within an aircraft cabin 20 for use in opening the door 10 from inside the cabin. A detailed description of handles 16 and 18 and their associated linkage is given below.

As the door 10 opens, an upper portion 10b of the door swings outwardly and downwardly from the closed position shown in FIG. 2 through an arcuate path until the upper portion 10b is adjacent an upper skin 14a of the wing. As shown in FIG. 4, a cabin floor 22 is at a lower level than the upper skin 14a of the wing. A series of steps 24 are formed along an interior surface of interior door panel 10c of the door 10 so that, when the door 10 is in its open position, the steps 24 form a stairway up from the cabin floor 22 onto the exterior of wing upper skin 14a. The interior panel 10c of the door could also be formed as a flat inclined plane so that in the open position the door panel 10c would form a ramp leading from the cabin floor 22 to the higher upper skin 14a of the wing 14.

When the door 10 is in its closed position, an exterior door panel 10a of the door is flush with an exterior skin 12a of the fuselage, the blend region 13 and the upper skin 14a of the wing. In the preferred embodiment of the door of the present invention, a movable wing panel 26 is provided in the upper skin 14a of the wing 14 adjacent and extending outwardly along the wing from the lower portion 10d of the door 10 when the door is in its closed position. The panel 26 is operatively connected to the door 10 by a linkage, which will be more fully described below, so that as the door 10 opens as shown in FIG. 3, the panel 26 moves outboard from the fuselage 12, thereby uncovering an opening 28 (FIG. 4) in the upper skin 14a of the wing 14 through which the door 10 passes as the door moves to its open position.

FIGS. 5a through 5d are views of a cross section of the wing 14 and the fuselage 12 looking forwardly and showing the sequence of operation of the door 10 from its fully closed position in FIG. 5a to its fully open position in FIG. 5d. In FIGS. 5a-5d only the aft side of the door 10 is visible, however, the wing section visible in these figures is located forward of the door 10. A set of tracks is located on the door 10 and the wing 14. Because of the orientation of the drawing, the door track located on the aft side of the door 10 is visible in the drawing while the tracks (wing track and panel track) located on the wing forward of the door are visible in the drawings. To facilitate an understanding of the invention and drawings the aft door track visible in the drawings is denote 44'. The forward door track, denoted 44, is not visible in FIGS. 5a-5d but is visible in FIGS. 6, 7 and 8. The forward wing track visible in FIGS. 5a-5d is denoted 46 and the forward panel track denoted 48. A mirror image set of tracks is located on the wing aft of the door 10 but is not visible in the drawings. It is to be understood that as the door 10 swings from the closed to the open position the tracks of the forward set cooperate with one another and the tracks of the aft set cooperate with one another. A more complete description of the tracks and their mode of cooperation is given below.

As shown in FIG. 5a, when the door 10 is in its fully closed position, the exterior surface of the door panel 10a is flush with the fuselage exterior skin 12a and both blend smoothly into the upper wing skin 14a, forming an elongated, shallow "S" curve. In the closed position, the inside handle 18 is in a substantially vertical position. The door 10 is secured in the closed position by door stops 30 (only one of which is illustrated) which are located at predetermined, spaced locations around the door frame 11 and are affixed to the frame 11. Securing pins 32 (or followers) extend from the sides of the door 10 at locations corresponding to the locations of the door steps 30 on the door frame 11. The securing pins 32 engage their associated door stops 30 when the door is in the closed position. The door stops 30 are U-shaped channels that open upwardly and are angled slightly outwardly relative to the door opening. The door stops 30 prevent lateral movement of the door 10 and make it impossible to open the door 10 without first moving the door in an upward direction a sufficient amount to allow securing pins 32 to clear the door stops 30. A suitable pressure seal (not shown) is associated with the periphery of the door and the opening to provide an airtight seal when the cabin is pressurized.

To open the door 10 from inside the cabin, the inside handle 18 is swung upwardly and inwardly from its closed position (as shown in FIGS. 5a and 6) to a substantially horizontal position (the opened or unlocked position shown in FIGS. 5b and 7). The movement of handle 18 causes a handle linkage 34 to move the bottom portion 10d of the door 10 inwardly and upwardly to free the securing pins 32 from the door stops 30. Referring to FIG. 6, the motion of the bottom portion 10d of the door is controlled by a crankshaft 89. Crankshaft 89 has a crank portion 90 which is journalled in and passes through the bottom portion 10d of the door in a fore-aft direction. Extended portions 90a and 90b of the crankshaft extend past the door on each side. Crank arms 88 and 92 are affixed, respectively, to extended portions 90a and 90b of the crankshaft 89. When the door 10 is in the closed position, the crank arms 88 and 92 extend downwardly and slightly outboard and are affixed to main shaft portions 86 and 94 which are rotatably mounted in suitable bearings on the fuselage 12 on opposite sides of the door 10 and oriented in a fore-aft direction. When the handle 18 is swung to the horizontal position, the linkage 34 causes the main shaft portions 86 and 94 to rotate in a clockwise direction looking aft which in turn causes the crank portion 90 to swing first inwardly and upwardly and then outwardly and upwardly through an arc of approximately 190°. The bottom portion 10d of the door 10 moves with the crank portion 90 and therefore moves inwardly and upwardly a sufficient distance to cause the securing pins 32 to translate out of the door stops 30 as shown in FIGS. 5b and 7. The door 10 is then free to pivot about crank portion 90 to the open position.

A transverse notch 36 in the upper portion of the interior panel 10c of the door 10 provides clearance for the door to move upwardly without abutting a top edge 11a of the door frame 11. When the door 10 has reached the unplugged position shown in FIG. 5b in which the door stops have been cleared, the door is urged toward the open position by the contractile force of a spring device. Although the spring device pictured is a coil spring 38, any spring means, such as a liquid spring or a band of elastomeric material, can be substituted as long as it has the capability to pull downwardly on the door. The spring 38 is in a stretched condition when the door 10 is closed, an upper end of the spring 38 being pivotally attached to a spring bracket 40 which extends outboard from the bottom portion 10d of the door into a wing cavity 14b of the wing 14. The lower end of the spring 38 is attached to a second spring bracket 41 on a hydraulic piston and cylinder assembly 42. The cylinder is mounted on a sliding bracket, which is in turn attached to the fuselage 12 below the door frame 11. The sliding bracket and its function will be explained in greater detail in a later portion of the specification. When the door 10 is freed from the stops 30, the spring 38 can contract, thereby urging the door 10 outwardly toward its open position. The door assembly is so configured that if the aircraft is level, the door 10 will normally fall under the influence of gravity into the open position after it is released from the stops 30. When the aircraft is not level, the spring 38 assures that the door will swing outwardly by an amount sufficient to allow gravity to pull the door completely open. To prevent the door 10 from slamming down into the open position, the hydraulic piston and cylinder assembly 42 is mounted between the spring bracket 40 on the door 10 and the fuselage 12 to act as a damper to slow the downward movement of the door 10. The exact configuration of the hydraulic piston and cylinder assembly 42 will be described in detail below.

As earlier stated the wing panel 26 moves outboard to uncover wing opening 28 as the door 10 swings to the open position. A guide mechanism is necessary to program the translation of the panel 26 to precede the motion of the door 10 so that the inboard edge of the panel 26 is always in close proximity to the exterior panel 10a of the door throughout the opening sequence of the door 10. By providing a minimum of space between the panel 26 and the door 10, personnel who may be outside the aircraft are prevented from catching their feet or other appendages between the panel and door. The programming of the translation of the wing panel 26 is accomplished by means of the two previously mentioned sets of tracks and associated linkage.

To reiterate, the tracks 46 and 48 visible in FIGS. 5a-5d are mounted on the wing 14 forward of the door 10, while the door track 44' which is visible is affixed to the aft side of the door. The forward door track 44 which cooperates with the forward wing and panel tracks 46, 48 respectively, is only visible in FIGS. 6, 7 and 8. To facilitate understanding of the workings of the door assembly only the forward set of tracks 44, 46 and 48 and their associated linkages and interactions will be described. Those skilled in the art and others will appreciate that a mirror image set of tracks and linkages is located aft of the door 10 and interacts in the same manner as the forward tracks described. Thus, when track 44 on the forward side of the door is referred to in connection with FIGS. 5a-5d, it must be understood that track 44' on the aft side of the door is always in the same position as forward track 44 and thus can be viewed as track 44.

The door track 44 affixed to the forward side of the door 10 runs in a generally upright direction when the door 10 is in the closed position. The door track 44 has an upper portion 44a which generally follows the curvature of the upper exterior portion of door 10 and a bottom portion 44b which curves outwardly and downwardly into the wing cavity 14b when the door is closed. The wing track 46 is mounted on a wing structural member 50 which defines the forward side of the wing opening 28, spaced downwardly from the upper skin 14a, and runs generally horizontally in an outboard direction along the forward edge of the wing opening 28. An outboard end 46a of the wing track 46 extends substantially horizontally transverse to the fuselage and has an inboard portion 46b which curves inwardly and slightly downwardly contiguous to an inboard end 46c. The inboard end 46c forms an extension of inboard portion 46b and curves sharply downwardly, and slightly outwardly in a hooked shape. When the door is closed, a bottommost end 44c of the door track 44 is positioned adjacent the inboard end 46c of wing track 46. A common follower 52 engages both the door track 44 and the wing track 46. (Again, follower 52' located aft of the door is shown in FIGS. 5a-5d; however, follower 52 [not shown] the forward side of the door lies directly in front of follower 52' and engages tracks 44 and 46.) A second follower 54 (on the forward side of the wing opening) engages the second track 46 outboard of the common follower 52. An inboard panel bracket 56 extends downwardly from and is affixed to the inboard end of the movable wing panel 26. The second follower 54 is rotatably mounted on the inboard panel bracket 56. A panel push rod 58 is pivotally connected at its inboard end to the common follower 52. The push rod 58 extends outboard from the common follower and is pivotally attached at its outboard end to the inboard panel bracket 56. As the door swings open from its unplugged position (FIG. 5b), the common follower 52 rides outboard along the wing track 46. The motion of the common follower causes the push rod 58 to push the second follower 54 and the inboard panel bracket 56 outboard, thereby translating the wing panel 26 outboard towards its second position, uncovering the wing opening 28.

The outboard end of the wing panel 26 is supported by panel track 48. The panel track 48 is mounted on the forward wall 50 and extends substantially horizontally above and outboard of the second track 46. The outboard end 46a of the wing track 46 lies approximately midway between outboard and inboard ends 48a and 48b respectively of the panel track 48. The inboard end 48b of the panel track has a slight upward curve. A third follower 60 engages the panel track 48 and is attached to an outboard end 26a of the wing panel 26 by an outboard panel bracket 62. As the wing panel 26 is pushed outboard by the push rod 58, the third follower 60 rides down the curvature of the inboard end 48b of the panel track 48, pulling panel 26 down with it below the wing upper skin 14a and permitting the wing panel 26 to move outboard below the wing upper skin 14a and within the wing cavity 14b as the third follower 60 moves outboard along the panel track 48. As the wing panel 26 moves outboard, the inboard edge of a lip panel 64, hinged along its outboard edge to the outboard edge of the wing opening 28, rides up on top of the wing panel 26, blocking the gap between the wing panel 26 and the wing upper skin 14a. The purpose of lip panel 64 is to prevent personnel standing on the wing panel 26 from catching their feet between the movable wing panel 26 and the wing upper skin 14a as the door 10 opens and the wing panel 26 moves.

Proceeding through the door opening sequence depicted in FIGS. 5a through 5d, when door 10 is in the closed position (FIG. 5a), the common follower 52 is at the bottom end 44c of door track 44 and the inboard end 46c of second track 46. As handle 18 is raised, the bottom portion 10d of the door 10 is moved inwardly and upwardly by the rotation of the crank portion 90 of the crankshaft 89. As the door 10 moves upwardly the door track 44 pulls the common follower 52 up with it along the hook portion of the wing track 46 until the door 10 is at the position wherein securing pins 32 are free of door stops 30. The biasing force of the spring 38 then pulls the door 10 toward the open position so that the upper portion 10b of the door moves in an arcuate path outboard and downwardly with bottom portion 10d of the door 10 pivoting about the crankshaft portion 90 of the crankshaft 89 which runs through the bottom portion 10d of the door substantially parallel to the fore-aft axis of the aircraft. As the door 10 continues to open, the common follower 52 rides upwardly within the door track 44 and outboard along the wing track 46. The outboard movement of the common folower 52 causes the panel push rod 58 to move outboard thereby urging the wing panel 26 outboard, and uncovering the wing opening 28 as the door 10 swings downwardly toward the open position. The curvature of the door track 44 and the second track 46 are designed so that the inboard edge of the panel 26 is in closed proximity to the exterior panel 10a of the door 10 throughout the opening sequence. Because of the curvature of the exterior surface of the door 10 the outboard movement of the exterior of the door at the beginning of the door's downward swing is slow relative to the downward speed of the door, however, at the end of the swing the door curvature is such that the outboard movement of the door exterior is rapid relative to the downward speed. The downward speed of the door remains substantially constant throughout the opening sequence. When the door 10 reaches its open position, the common follower 52 is at the upper end 44a of the door track 44 and is spaced from the outboard end 46a of the wing track 46 a distance equal to the length of the push rod 58. The second follower 54 is at the outboard end 46a of the second track 46 and third follower 60 is at the outboard end 48a of the panel track 48. The free end of the lip panel 64 rests on the inboard edge of the wing panel 26 adjacent the top portion 10b of the door to form a flush surface between wing upper skin 14a, lip panel 64 and the uppermost of the steps 24. A stairway is then provided along the steps 24 from the cabin floor 22 to the wing upper skin 14a.

FIGS. 6 and 7 show in greater detail the interior handle 18 and the exterior handle 16 and the handle linkage 34 which enables an operator to open the door 10. FIG. 6 shows the handle linkage in the door closed position. The inside handle 18 is an elongate member which is rigidly connected at an upper end 18a to a handle shaft 66. The handle shaft 66 is rotatably mounted on the fuselage 12 adjacent the forward side of the frame 11 and is oriented in a generally fore/aft direction. The handle 18 is in a substantially vertical position in the door closed position and pivots about the first end 18a to a substantially horizontal position to open the door 10. A first crank 68 is affixed to the handle shaft 66 forward of the handle 18. The first crank 68 extends slightly downwardly and inwardly and is also pivotally attached to an upper end 70a of a first push rod 70. The first push rod 70 extends downwardly from the first crank 68 and has its lower end 70b attached to a bell crank 72. The bell crank 72 is affixed to and pivots about a second shaft 74 which is rotatably mounted generally horizontally and transversely to the handle shaft 66 and the fuselage. An upper end 76a of a second push rod 76 is pivotally connected to the bell crank 72 at a point below and aft of the point of attachment of the first push rod 70 to the bell crank 72. The arrangement of the bell crank 72 and the push rods 70 and 76 is such that when the handle 18 moves to a horizontal position it causes handle shaft 66 to rotate thereby rotating the first crank 68 inwardly and upwardly. As the first crank rotates, it pulls first push rod 70 upwardly and the first push rod 70 in turn rotates the bell crank forwardly and upwardly about the second shaft 74. As the bell crank 72 rotates it in turn pulls the second push rod 76 upwardly. A lower end 76b of the second push rod 76 is pivotally connected to a third crank 78, which crank is in turn affixed to a third shaft 80. The third shaft 80 is rotatably mounted in suitable bearings on the fuselage 12 parallel to the handle shaft 66. A first spur gear 82 is affixed to and rotates with the third shaft 80. The first spur gear 82 engages a second spur gear 84 which is mounted on the forward end of the crankshaft 89. The second spur gear 84 is of a smaller diameter than the first spur gear 82 so that rotation of the first spur gear 82 through a small angle causes the second spur gear 84 to rotate in the opposite direction through a greater angle. The second spur gear 84 is affixed to a forward end 86a of the main shaft portion 86 of the crankshaft 89. An aft end 86b of the main shaft portion 86 is rigidly attached to the crank arm of the crankshaft 89 which in turn is rigidly connected to the crank portion 90. The crank portion 90 passes through the bottom portion 10d of the door 10 substantially parallel to the fore-aft axis of the aircraft. The crank portion 90 has extended portions 90a and 90b extending beyond opposite sides of the door 10.

The first extended portion 90a adjacent handle linkage 34 is rigidly attached to the crank arm 88. The second extended portion 90b is rigidly attached to the crank arm 92 which in turn is rigidly attached to the main shaft portion 94 rotatably mounted on door frame 11 parallel to the crank portion 90 and aligned with the main shaft portion 86.

To open the door 10 from inside the cabin 20, the interior handle 18 is rotated clockwise looking aft from its vertical position to its horizontal position, thereby rotating the handle shaft 66 and the first crank 68 in a clockwise direction. The clockwise rotation causes the first crank 68 to pull the first push rod 70 upwardly which in turn rotates the bell crank 72 counterclockwise, thereby pulling the second push rod 76 upwardly. The upwardly movement of the second push rod 76 rotates the third crank 78 counterclockwise, thereby rotating the third shaft 80 and the first spur gear 82 counterclockwise. The first spur gear 82 drives the second spur gear 84 in the opposite, that is, clockwise, direction, thereby rotating the main shaft portion 86 and in turn the crank arm 88 in a clockwise direction. The rotation of the crank arm 88 causes the crank portion 90 to rotate clockwise about the main shaft portions 86 and 94, pivoting on crank arms 88 and 92. Since the crank portion 90 passes through the bottom portion 10d of the door 10, as the crank portion 90 rotates, it carries the bottom portion 10d of the door with it, moving the bottom of the door first inwardly and then upwardly. The spur gears 82 and 84 and the lengths of the push rods 70 and 76 are designed such that, when the handle 18 moves from its vertical to its horizontal position through approximately 90°, the crank portion 90 rotates through approximately 190°, finishing its rotation at a slightly overcenter position. The length of the crank arms 88 and 92 must be sufficient to move the door 10 upwardly far enough to disengage the retaining pins 32 from the door stops 30. The open position of the handle 18 and the linkage 34 is shown in FIG. 7.

The exterior handle 16 can also be used to operate the handle linkage 34. Referring again to FIG. 6, the first end 16a of handle 16 is free to swing up and down about the second end 16b of the handle 16, which is pivotally mounted by a suitable shaft and bearing in the wing 14. A third push rod 96 is pivotally attached at a forward end 96a to a downwardly extending bracket on the underside and approximately the midpoint of the handle 16. The third push rod 96 extends aft and slightly downwardly to an aft end 96b located below the second shaft 74. The aft end 96b of the push rod 96 is pivotally attached to a sixth crank 98 which is in turn affixed to the second shaft 74. To open the door 10 from outside the aircraft, the exterior handle 16 is pulled upwardly and forwardly, thereby causing the third push rod 96 to move upwardly, rotating the sixth crank 98. The rotation of the sixth crank 98 rotates the second shaft 74 in a counterclockwise direction. The rotation of the second shaft 74 rotates the bell crank 72 counterclockwise which in turn pulls second push rod 76 upwardly and rotates the third crank 78, the third shaft 80 and the first spur gear 82 in a counterclockwise direction. The first spur gear 82 drives the second spur gear 84 in a clockwise direction, thereby rotating the main shaft portion 86 and the crank arm 88 clockwise. The rotation of the crank arm 88 causes the crank portion 90 to rotate clockwise about the main shaft portions 86 and 94 to move the bottom portion 10d of the door 10 first inwardly and then upwardly in order to disengage the retaining pins 32 from the door stops 30 (as shown in FIG. 7).

A more detailed view of the configuration of the hydraulic piston and cylinder assembly 42 (which serves the dual function of showing the downward movement of the door during the opening sequence and returning the door to its closed position from the open position) and the opening spring 38 is shown in FIG. 8. In FIG. 8, the door 10 is in the closed position. The spring bracket 40 is affixed to the bottom portion 10d of the door 10 and extends outboard into the wing cavity 14b. The upper end 38a of the spring 38 is pivotally attached to the spring bracket 40. An upper end 42a' of a piston rod 42a is also pivotally attached to the spring bracket 40 adjacent the upper end 38a of the spring 38. A lower end 42a" of the piston 42a is attached to a piston which is within the hydraulic cylinder 42c but is not visible in the drawing. A lower end 38b of the spring 38 is attached to a spring rod 106 at an upper end 106a. A lower end 106b of the spring rod is slidably mounted in the spring bracket 41, in turn attached to the outboard side of the housing of the hydraulic cylinder 42c approximately midway between upper and lower ends 42c' and 42c", respectively, of the hydraulic cylinder 42c. The lower end 42c" of the hydraulic cylinder 42c is affixed to a shelf bracket 108. A slide bracket 110 is affixed to the fuselage 12 at a location below the door frame 11. A pair of rollers 112 are rotatably mounted on a first end 108a of the shelf bracket 108 adjacent the fuselage 12. The rollers 112 engage a generally upright slot 114 formed through slide bracket 110 parallel to the fuselage 12 and are free to translate along the slot 114, thereby mounting the shelf bracket 108 for generally upward and downward movement.

When the door 10 is in the closed position, the spring 38 is in a stretched condition and the piston rod 42a is extended from the hydraulic cylinder 42c. When the door is moved upwardly a sufficient amount to disengage the retaining pins 32 from the door stops 30, the contractile force of spring 38 pulls the spring bracket 40 downwardly, in turn causing the door 10 to swing toward the open position. As the door 10 swings downwardly, the piston rod 42a pushes the piston toward the bottom end 42c" of the hydraulic cylinder 42c. The hydraulic cylinder 42c is coupled to a pressurized source of hydraulic fluid (not shown) by a hose 116 located near the bottom end 42c" of the hydraulic cylinder 42c. As the door 10 swings downwardly, the pressure in hydraulic cylinder 42c is slowly released by means of a metering valve (not shown). The function of the hydraulic piston and cylinder assembly 42 is to provide a resistance force to slow the downward motion of the door 10 to prevent it from slamming down through the wing opening 28.

When the door 10 is in the open position, the hydraulic piston and cylinder assembly 42 is used to urge the door toward its closed position. Pressurized hydraulic fluid is pumped from a source (not shown) into the hydraulic cylinder 42c through the hose 116 forcing the piston upwardly, thereby pushing piston rod 42a upwardly from the cylinder 42c. The pressure of the hydraulic fluid must be sufficient to overcome both the weight of the door 10 and the tension of the spring 38. The piston rod 42a pushes the spring bracket 40 upwardly, in turn urging the door 10 upwardly toward its closed position. When the door 10 reaches a predetermined position near the door closed position either of the handles 16 or 18 can be operated to finally secure the door 10.

During the opening sequence of the door, prior to any arcuate outward and downward movement of the top portion 10b of the door 10, the door moves linearly upwardly to clear the door stops 30. Also, just prior to final securing of the door 10, the door moves linearly downwardly to secure the door 10 within the door stops 30. The linear upward and downward movement of the door must be compensated for in order to allow the hydraulic piston and cylinder assembly 42 and the spring 48 to maintain their proper orientation and tension for controlling the arcuate motion of the door 10. The compensation is provided by the sliding bracket 110 which allows the second end 42c'' of the hydraulic cylinder 42c to move linearly upwardly and downwardly coincident with the linear upward and downward movement of the bottom portion 10d of the door 10. The proper spacing relationship between the cylinder 42c and the door 10 is provided by spacer rods 118 and 118' which are pivotally attached at an upper end 118a and 118a' to the bottom portion 10d of the door 10, one spacer rod being located on each side of spring bracket 40. The spacer rods 118 and 118' extend downwardly and slightly inboard in generally parallel spaced relation for one another and terminate in second ends 118b and 118b' which are pivotally attached to opposite sides of the shelf bracket 108. As the bottom portion 10d of the door 10 moves upwardly and downwardly, the spacer rods 118 and 118' pull the shelf bracket 108 upwardly and downwardly and thereby move the piston and cylinder assembly 42 and the spring 38 upwardly and downwardly without changing the amount of extension of either the spring 38 or the piston rod 42a.

The door of the present invention is designed primarily for use on an aircraft having a pressurized cabin. For safety purposes, it is desirable to have some means of equalizing the pressure within and without the cabin prior to the door being opened to insure that the door will not be blown out by any excess cabin pressure. Such a pressure relief door 120 is shown in FIG. 9. The pressure relief door 120 is shown in the closed position by the solid lines and is shown in the open position by the phantom lines. FIG. 9 is a side view in partial section of the door 10 described above looking forward along the aircraft. The pressure relief door 120 covers an opening 122 formed in the exterior panel 10a of the door 10. The opening 122 is circular and is surrounded by a circular outer frame 124 affixed to and coextensive with the perimeter of the opening 122. An inner frame 126 fits slidably and concentrically within the outer frame 124. The inner frame 126 has a flange portion 128 which extends from the inboard edge of the inner frame and is in register with the inboard side of the outer frame 124. A pressure seal 130 is mounted between the inboard side of the outer frame 124 and the outboard side of the flange portion 128 of the inner frame 126 around the entire circumference of the inner and outer frames to provide an airtight seal around the pressure relief door when the door 10 is secured and the cabin is pressurized. The inner frame 126 preferably has an exterior window 132 mounted within it and preferably also has a wide angle lens 134 mounted within it inboard of the window 132. A bell crank 136 is affixed at an upper portion 136a to the bottommost portion of the flange portion 128 of the inner frame 126. A bottom portion 136b of the bell crank 136 is pivotally attached to the door 10 by means of a crank bracket 138. As the bell crank 136 pivots the upper portion 136a moves inboard, in turn moving the inner frame 126 inboard, thereby uncovering the opening 122 and allowing the pressure within and without the cabin to equalize. The pressure relief door 120 is biased toward a closed position by a spring 140 which is attached at an outboard end 140a to the door 10 at a point above the outer frame and at an inboard end 140b to the topmost section of the flange portion 128 of the inner frame 126.

The control mechanism for the operation of the pressure relief door 122 comprises a crank push rod 142 which is attached at an upper end 142a to a central portion 136c of the bell crank 136. The crank push rod 132 extends inboard and downwardly and attaches at a lower end 142b to an eighth crank 144. The eighth crank 144 angles downwardly and outboard and is affixed to a relief door control shaft 146. The control shaft 146 lies within the interior of the door 10 substantially parallel to the fore-aft axis of the aircraft. A forward end 146a of the control shaft 146 extends beyond the forward side of the door 10 and has a cam follower member 148 affixed to it. When the door 10 is in the closed position, the cam follower 148 engages a radial notch 150 formed in the perimeter of a cam member 152. The cam member 152 is affixed to an end of the handle shaft 66 adjacent the forward side of the door 10. When the interior handle 18 swings from its vertical to its horizontal position to open the door 10 it rotates the handle shaft 66 in a counterclockwise direction as shown in FIG. 9, thereby rotating cam member 152 counterclockwise. As the cam member 152 rotates, the cam follower 148 disengages from the notch 150 and rides along the outer perimeter of the cam member 152. The rotation of the cam member 148 out of the notch 150 rotates control shaft 146 clockwise as shown in FIG. 9 which in turn rotates eighth crank 144 clockwise, thereby pulling crank push rod 142 downwardly. The downward motion of the crank push rod 142 pivots the bell crank 136 thereby moving inner frame 126 inwardly to uncover the opening 122. The cam follower 148 disengages from the notch 150 prior to the time the handle 18 reaches the full open position, therefore the relief door 120 opens prior to the door 10 moving a sufficient distance to disengage the securing pins 32 from the stops 30. The above sequence allows the pressure within and without the cabin to equalize prior to the time when the door 10 is free to swing open and prevents the door 10 from being blown out by residual high pressure within the cabin. When the door 10 is moved to its closed position, the cam follower 148 drops into the notch 150 and the above-described sequence reverses, causing spring 140 to pull the relief door 120 to the closed position covering the opening 122.

The illustrated embodiment of the door 10 preferably has an interior window 154 located in the step 24 that is opposite the exterior window 132 in the pressure relief door 120. The two windows 154 and 132 enable personnel within the cabin to view outside the aircraft prior to opening the door 10 to determine if any obstruction is present which might prevent the door 10 from opening. The wide angle lens 134 assures a full field of view near the door. A hinged cover plate 156 covers the interior window 154 and is attached to the step 24 and held closed by a rotating latch 158. The cover plate 156 may be opened when the personnel within the cabin wish to view outside the cabin and may be closed when the door 10 is opened to prevent personnel from stepping on the interior window 154.

From the foregoing, it will be appreciated by those skilled in the art and others that a midcabin door assembly for use in an aircraft having the fuselage and wing constructed according to a blended wing design and having a door opening in the fuselage adjacent the wing is disclosed. The door assembly comprises a door which is movable between a first position in which it is flush with the exterior of the aircraft and has a top edge adjacent the top edge of the door opening and a second position in which the door lies substantially within the wing and has a top edge adjacent the upper surface of the wing. Preferably, the door has formed on its interior surface a series of steps so that, when the door is in its open position, the steps provide a stairway from the cabin floor up and onto the upper surface of the wing. Preferably, the door has associated with it a movable wing panel which moves outboard as the door is opened to uncover an opening in the wing surface through which the door passes as it moves to its open position.

Although a preferred embodiment of a door assembly made in accordance with the principles of this invention has been described and illustrated, it will be appreciated by those skilled in the art and others that changes can be made to the preferred embodiment while remaining within the scope of the invention as defined in the following claims.

The embodiments of the invention in which an exclusive property or privilege is claimed are defined as follows:

1. In an aircraft of blended wing design having a fuselage and a wing, said wing having an upper surface, that blends smoothly into the fuselage to form a blend region between said wing and said fuselage, said aircraft having a door opening in said fuselage, at least a portion of said opening extending into said upper surface of said wing, a door assembly comprising:

a door having an upper portion and a lower portion and having an exterior panel conforming to the shape of the fuselage and the blend region when the door is in a closed position; and first means for mounting said door for swinging movement between said closed position wherein said upper portion of the door is adjacent an upper portion of the door opening and said lower portion of said door is adjacent a lower portion of said door opening and an open position wherein said upper portion of said door is located outwardly from said fuselage and subjacent said upper surface of said wing.

2. In an aircraft having a fuselage and a wing, said wing having an upper surface that blends smoothly into the fuselage to form a blend region between said wing and said fuselage, said aircraft having a door opening in said fuselage, said door opening including a first portion extending into said blend region and an extended portion extending outwardly from said first portion into said upper surface of said wing, an improved door assembly comprising:

a door having an upper portion and a lower portion and having an exterior panel conforming to the shape of the fuselage and the blend region when the door is in a closed position wherein said upper portion of said door is adjacent an upper portion of said door opening and said lower portion of said door is adjacent a lower portion of said door opening;

a wing panel covering said extended portion of said door opening when said door is in said closed position;

means for mounting said wing panel for translational movement from a closed position covering said extended portion to an open position wherein said wing panel is spaced from said extended portion; and means for mounting said door for movement of said door from said closed position to an open position, said movement being such that said upper portion of said door swings outwardly from said fuselage and downwardly through said extended portion of said door opening, said door when in said open position being positioned subjacent said upper surface of said wing.

3. The door assembly of claim 2 further comprising:
coupling means for coupling said door to said wing panel for programming the movement of said wing panel so that said wing panel translates out of registration with said extended portion of said door opening as said door swings from said closed position to said open position and so that an inner edge of said wing panel always lies adjacent said exterior panel of said door as said door swings between said open and said closed positions.

4. The door assembly of claim 3 wherein said means for mounting said wing panel so mounts said wing panel that an outer edge of said wing panel first moves downwardly below said upper surface of said wing as said door begins to move from said closed position to said open position, and said wing panel translates outwardly below said wing surface as said door continues to move toward said open position.

5. The door assembly of claim 2 wherein said means mounting said door for swinging movement comprises a crankshaft having a crank portion, the lower portion of said door being mounted on the crank portion of said shaft for pivotal movement, the axis of said crank shaft lying inwardly from the outer surface of the fuselage and downwardly from the upper surface of said wing and being oriented transversely to said door opening.

6. The door assembly of claim 5 further comprising stop means associated with said door opening and said door for securing said door in said opening when said door is in said closed position.

7. The door assembly of claim 6 wherein said crankshaft is pivotally mounted adjacent the lower portion of said door opening for swinging the crank portion of said shaft through an arc that extends first inwardly and upwardly and then outwardly and upwardly relative to said door opening, said stop means comprising a track affixed to the fuselage adjacent said upper portion of said door opening, said track having an upwardly and outwardly extending guide portion for receiving a follower, and a follower mounted on said door for engaging said track, said follower engaging said guide portion of said track when said crank portion is positioned at the bottom portion of said arc, said follower moving upwardly and disengaging from said track as the crank portion of said shaft swings upwardly, thereby freeing said door from said stop means and readying said door for outward and downward swinging movement about said crank portion of said shaft.

8. The door assembly of claim 7 further comprising biasing means associated with said door and said fuselage for urging said door toward said open position when said door is free of said stop means.

9. The door assembly of claim 8 wherein said biasing means comprises a spring having an upper and a lower end, said upper end being pivotally attached to said bottom portion of said door and said lower end being pivotally attached to said fuselage below said door opening, said spring being in an expanded condition when said door is in said closed position.

10. The door assembly of claim 7 further comprising damping means associated with said door and said fuselage for slowing the downward movement of said door as it swings toward said open position.

11. The door assembly of claim 10 wherein said damping means comprises a hydraulic piston and cylinder assembly including:
   a cylinder having an upper end and a lower end, said lower end being pivotally attached to said fuselage below said door opening;
   a piston mounted in said cylinder for movement between said upper and lower ends; and a piston rod having an upper and a lower end, said lower end being affixed to said piston and said upper end being pivotally connected to said lower portion of said door so that when said door is in said closed position said piston rod extends from said cylinder and said piston is at said upper end of said cylinder and as said door swings toward said open position, said piston rod is pushed downwardly and in turn pushes said piston toward said lower end of said cylinder.

12. The door assembly of claim 11 wherein said hydraulic piston and cylinder assembly is operable when said door is in said open position to move said door from said open position toward said closed position by extending said piston rod from said cylinder.

13. The door assembly of claim 3 wherein said coupling means comprises:
   a door track affixed to a side of said door, said door track having an upper portion which substantially follows the contour of said exterior panel, a center portion which curves downwardly and inwardly toward said fuselage when said door is in its closed position, a lower portion which curves downwardly and outwardly away from said fuselage, and ending in a lower end;
   a wing track mounted on said wing below a spanwise edge of said extended portion of said door opening transverse to said fuselage, said wing track being mounted on the side of said extended portion corresponding to said side of said door on which said door track is affixed, said wing track having an inboard end, a first portion extending substantially upwardly from said inboard end, a second portion curving upwardly and outwardly from said fuselage, a third portion extending outwardly from said fuselage substantially parallel to said upper surface of said wing, and ending in an outboard end;
   a common follower member which engages said door track and said wing track;
   a rigid arm having a first and a second end, said first end being pivotally attached to said common follower; and
   attachment means for pivotally attaching said second end of said rigid arm to said wing panel, said door track, wing track, common follower member and arm being arranged so that when said door panel is in said closed position said lower end of said door track is positioned adjacent the inboard end of said wing track, and as said door moves to its open position said common follower member rides upwardly within said door track and outwardly within said wing track, said common follower member thereby urging said rigid arm and in turn said wing panel in an outboard direction.

14. The door assembly of claim 13 wherein said attachment means comprises:
   a second follower member which engages said wing track, said second follower member being rotatably mounted on said movable wing panel and said second end of said rigid arm being attached to said second follower.

15. The door assembly of claim 3 further comprising:
   exit means associated with an interior surface of said door for providing a pathway from said fuselage to said wing upper surface when said door is in said open position.

16. The door assembly of claim 15 wherein said exit means comprises:
   a plurality of steps formed on said interior surface of said door so that when said door is in said open position said steps form a stairway leading up and out of said fuselage to said wing upper surface.

17. The door assembly of claim 3 wherein said exterior panel of said door has a first opening formed therein, said door further comprising:
   an interior panel having a second opening formed therein, said interior panel being spaced from said exterior panel, said first and second openings being aligned;
   an exterior transparent window mounted in said first opening; and
   an interior transparent window mounted in said second opening said first and second windows being optically aligned to form an optical path through said door.

18. The door assembly of claim 17 wherein said door further comprises a wide angle lens mounted in said first opening adjacent said exterior window and optically aligned therewith.

19. The door assembly of claim 7 wherein said exterior panel of said door has an opening formed therethrough, said door assembly further comprising a pressure relief door and means mounting said pressure relief door on an interior surface of said exterior panel of said door for movement between a first position adjacent said door panel and covering said opening and a second position spaced from said opening; and
   pressure relief linkage means for moving said pressure relief door between said first position and said second position, said pressure relief linkage means being responsive to movement of said crank portion and stop means so that said pressure relief door is in said first position when said crank portion is at the bottom of said arc and said stop means is securing said door and said pressure relief door moves to said second position as said crank portion begins to move inwardly and upwardly through said arc so that said pressure relief door is in said second position prior to the time said door becomes released from said stop means.

20. The door assembly of claim 7 further comprising:
   an interior handle;
   means for mounting said handle on said fuselage for swinging movement between a closed position and an open position; and crankshaft linkage means associated with said crankshaft and said interior handle and operable by movement of said handle between said closed and open positions so that said crank portion is at the bottom of said arc when said interior handle is in said closed position and said crank portion moves through said arc as said interior handle moves to said open position.

21. The door assembly of claim 20 further comprising:
an exterior handle;
means for mounting said exterior handle on said wing for movement between a closed and an open position, and means for coupling said exterior handle with said crankshaft linkage means to move said crank portion from the bottom of said arc through said arc as said exterior handle moves from said closed position to said open position.

* * * * *